United States Patent
Dorst et al.

(10) Patent No.: US 10,519,069 B2
(45) Date of Patent: Dec. 31, 2019

(54) ROLLER FOR A ROLLER FURNACE HAVING AT LEAST ONE COATING ON THE SURFACE

(71) Applicant: SAINT-GOBAIN INDUSTRIEKERAMIK RÖDENTAL GMBH, Rödental (DE)

(72) Inventors: Hans-Ulrich Dorst, Rödental (DE); Lothar Heringklee, Rödental (DE)

(73) Assignee: SAINT-GOBAIN INDUSTRIEKERAMIK RÖDENTAL GMBH, Rödental (DE)

( * ) Notice: Subject to any disclaimer, the term of this patent is extended or adjusted under 35 U.S.C. 154(b) by 0 days.

(21) Appl. No.: 16/318,843

(22) PCT Filed: Jul. 3, 2017

(86) PCT No.: PCT/EP2017/066447
§ 371 (c)(1),
(2) Date: Jan. 18, 2019

(87) PCT Pub. No.: WO2018/015132
PCT Pub. Date: Jan. 25, 2018

(65) Prior Publication Data
US 2019/0241477 A1    Aug. 8, 2019

(30) Foreign Application Priority Data

Jul. 18, 2016 (DE) .................. 10 2016 113 153
Jun. 27, 2017 (DE) .................. 10 2017 114 165

(51) Int. Cl.
*C04B 41/52* (2006.01)
*C04B 41/87* (2006.01)
(Continued)

(52) U.S. Cl.
CPC .......... *C04B 41/526* (2013.01); *C04B 41/009* (2013.01); *C04B 41/5031* (2013.01);
(Continued)

(58) Field of Classification Search
CPC ....... C04B 41/526; C04B 41/87; C04B 41/89; C04B 41/009; C04B 41/5031; F27B 9/2407; F27D 2003/0042
See application file for complete search history.

(56) References Cited

FOREIGN PATENT DOCUMENTS

DE  10 2011 051 270 A1  12/2012
EP     0 750 169 A1      12/1996
(Continued)

OTHER PUBLICATIONS

International Search Report as issued in International Patent Application No. PCT/EP2017/066447, dated Oct. 25, 2017.

*Primary Examiner* — Michael C Miggins
(74) *Attorney, Agent, or Firm* — Pillsbury Winthrop Shaw Pittman LLP

(57) ABSTRACT

A roller for a roller furnace with a roller base body and a coating on the surface, wherein the coating has a first layer, containing: 10.0-30.0 wt.-% Si, 10.0-30.0 wt.-% Al(OH)$_3$, 1.0-3.0 wt.-% B$_4$C, 0.5-1.5 wt.-% Y$_2$O$_3$, 0.1-1.0 wt.-% Fe$_2$O$_3$ and the remainder Al$_2$O$_3$ and a second layer, containing 10.0-30.0 wt.-% Si, 10.0-30.0 wt.-% Al(OH)$_3$, 1.0-3.0 wt.-% B$_4$C, 2.0-4.0 wt.-% Y$_2$O$_3$ and the remainder Al$_2$O$_3$.

17 Claims, 1 Drawing Sheet

(51) Int. Cl.
    *C04B 41/89*     (2006.01)
    *C04B 41/00*     (2006.01)
    *C04B 41/50*     (2006.01)
    *F27B 9/24*     (2006.01)
    *F27D 3/00*     (2006.01)

(52) U.S. Cl.
    CPC .............. *C04B 41/87* (2013.01); *C04B 41/89* (2013.01); *F27B 9/2407* (2013.01); *F27D 2003/0042* (2013.01)

(56) References Cited

FOREIGN PATENT DOCUMENTS

| | | |
|---|---|---|
| EP | 2 703 759 A1 | 3/2014 |
| WO | WO 2016/005454 A2 | 1/2016 |

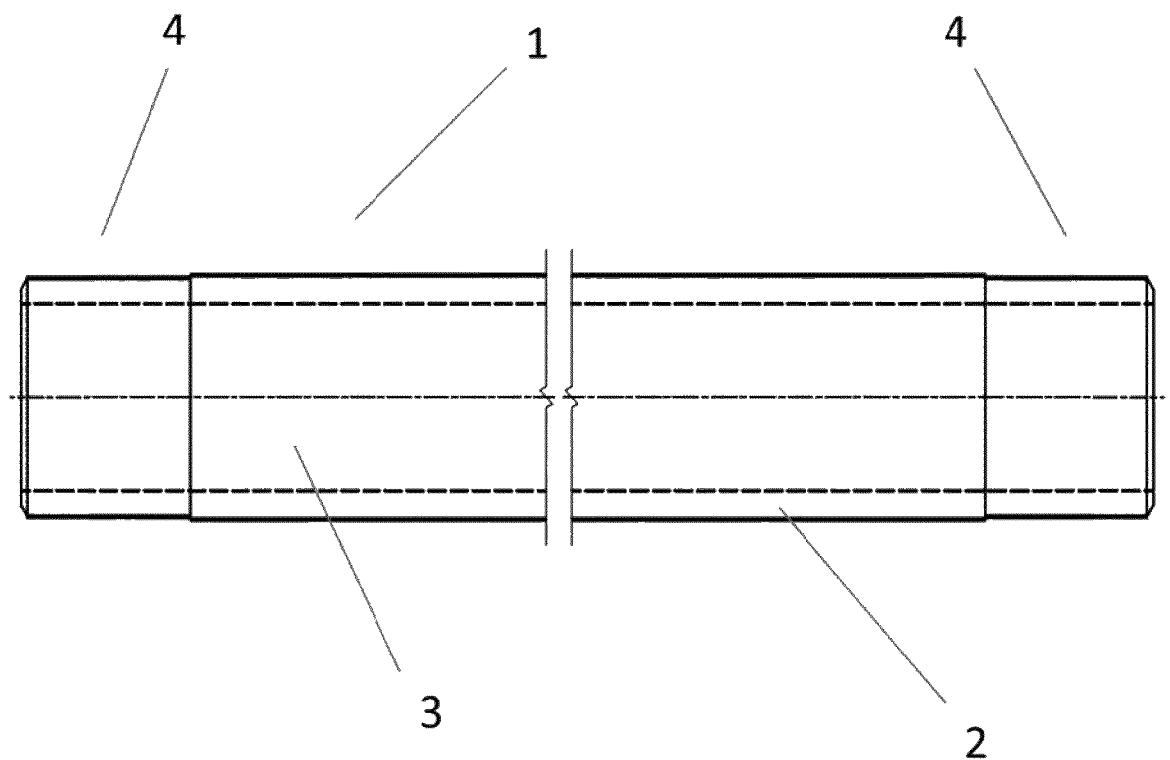

ROLLER FOR A ROLLER FURNACE HAVING AT LEAST ONE COATING ON THE SURFACE

CROSS-REFERENCE TO RELATED APPLICATIONS

This application is the U.S. National Stage of PCT/EP2017/066447, filed Jul. 3, 2017, which in turn claims priority to German patent application number 10 2016 113 153.9 filed Jul. 18, 2016 and German patent application number 10 2017 114 165.0 filed Jun. 27, 2017. The content of these applications are incorporated herein by reference in their entireties.

The present invention relates to a coated ceramic roller base body, in particular for use in a roller furnace for hot forming AlSi-coated metal sheets as well as a method for producing the coated roller base body. The invention further relates to a method for producing such a roller having a non-oxidic coating.

By hot forming auto body parts in the automotive industry, it is simultaneously possible to produce better hardened materials while lowering production costs through elimination of manufacturing steps and with reduced material use. For this, preformed components are heated to 900° C. to 1000° C. in a furnace, placed in a press by an industrial robot, and pressed into the desired shape at approx. 700° C.

The metal sheets are coated with an AlSi protective layer as protection against scaling and as an alloy constituent. Predominantly used for heating the metal sheets are roller furnaces, wherein the steel sheets are usually placed directly on the rollers or, alternatively, transported through the roller furnace positioned in carriers. During the heating of the AlSi-coated steel sheet to 900° C. to approx. 1000° C., softening of the AlSi protective layer occurs and contact corrosion subsequently occurs upon contact with the roller material.

Possible corrosion mechanisms are diffusion of AlSi into the porous structure of the roller, adhesion of AlSi to the roller surface, or a reaction in the form of a chemical transformation with the roller material. If AlSi diffuses into the roller structure, differences in the coefficient of expansion between the roller matrix, infiltrated AlSi, and corrosion-related reaction products cause thermal stresses; and, subsequently, chipping of the roller surface or roller breakage occurs. Adhesions of AlSi to the roller material can build up to several millimeters which cause displacements the of the steel sheets during transport through the furnace and, then, cause damage to the fiber lined furnace wall or problems during transfer of the sheets by the industrial robot.

For roller ovens that are operated at temperatures >600° C., ceramic rollers are necessary because of temperature resistance, creep resistance, and thermal shock resistance.

Known from DE 102011051270 A1 is a roller for a roller furnace that has a ceramic roller base body, wherein the roller base body is provided with an oxidic loadbearing surface coating. The loadbearing surface coating contains at least one oxide selected from the group $Al_2O_3$, $ZrO_2$, $Cr_2O_3$, $Y_2O_3$, $SiO_2$, CaO, MgO, $K_2O$, $TiO_2$, and/or FeO in a proportion of at least 50 wt.-%.

Known from EP 2703759 A1 is a loadbearing means for furnaces in which metallic workpieces are hot formed. The loadbearing means has a surface made of a thermostable metal oxide or metal nitride, such as aluminum oxide, boron oxide, or boron nitride.

In DE 102011051270 A1 and EP 2703759 A1, $SiO_2$ is described as a coating agent. The measures described there cannot prevent corrosion since $SiO_2$ is wetted by the melt of nonferrous metals and can thus reduce $SiO_2$ to metallic silicon. $SiO_2$ is frequently used for coatings as a ceramic binder or is frequently contained in traces as a glassy phase.

EP 0750169 A1 describes forms of a roller for roller furnaces that can be used for firing ceramic tiles. Ceramic rollers based on aluminum oxide, mullite, fused silica are known, but they are not corrosion resistant against AlSi alloys. In rollers based on SiC, particularly in non-oxide bonded SiC, such as nitride-bonded SiC or N—SiC, in fact, no infiltration or reaction with the roller structure is observed; however, buildups do occur.

The loadbearing surface coating should reduce the wettability of the rollers relative to AlSi metal melts. The loadbearing surface of the roller should be very smooth and not very porous. As is well known, the loadbearing surface of this coating contains at least one oxide, such as aluminum oxide, zirconium oxide, chromium oxide, yttrium oxide, silicon oxide, calcium oxide, magnesium oxide, potassium oxide, titanium oxide, and/or iron oxide of at least 50% by weight.

The known measures cannot prevent corrosion since it was not taken into account that with the presence of $SiO_2$, which is frequently also used for coatings as a ceramic binder or is present in traces, often as a glassy phase, corrosion protection is lost since $SiO_2$ is wetted by the melt and can be reduced to metallic silicon. In DE 102011051270 A1 and EP 2703759 A1, $SiO_2$ is listed as a possible coating agent.

During hot forming with AlSi-coated metal sheets, the problem arises that the materials of the rollers react chemically in the roller furnace with the AlSi of the coating of the workpieces and, consequently, the durability of the rollers is low.

The object of the present invention consists in providing a roller for a roller furnace for hot forming with AlSi-coated metal parts that has significantly longer durability and a longer service life than known rollers.

A further object of the present invention is to provide an improved roller furnace for the heating of coated steel sheets.

The object of the present invention is accomplished by a roller for a roller furnace having an improved coating according to claim 1. Advantageous embodiments of the invention are apparent from the dependent claims.

The object of the present invention is, consequently, accomplished by a roller for a roller furnace with a roller base body and a coating on the surface, wherein the coating has a layer containing:
10.0-30.0 wt.-% Si
10.0-30.0 wt.-% $Al(OH)_3$
1.0-3.0 wt.-% $B_4C$
0.5-1.5 wt.-% $Y_2O_3$
0.1-1.0 wt.-% $Fe_2O_3$
and the remainder $Al_2O_3$ and unavoidable impurities.

The proportion of $Al_2O_3$ can be from 40.0 wt.-% to 70.0 wt.-%. The proportion of $Al_2O_3$ can be as much as 78.4 wt.-%.

A preferred embodiment of the invention is a roller wherein the coating has a layer containing:
15.0-25.0 wt.-% Si
15.0-25.0 wt.-% $Al(OH)_3$
1.5-2.5 wt.-% $B_4C$
0.8-1.2 wt.-% $Y_2O_3$
0.3-0.7 wt.-% $Fe_2O_3$ and the remainder $Al_2O_3$ and unavoidable impurities.

The proportion of $Al_2O_3$ can preferably be 50.0 wt.-% to 60.0 wt.-%. The proportion of $Al_2O_3$ can be as much as 67.4 wt.-%.

With this coating, good results are achieved in the hot forming of AlSi-coated metal parts.

The object of the present invention is further accomplished by a roller for a roller furnace with a roller base body and a coating on the surface, wherein the coating has at least one layer, a) first layer, containing:
10.0-30.0 wt.-% Si
40.0-70.0 wt.-% $Al_2O_3$
10.0-30.0 wt.-% $Al(OH)_3$
1.0-3.0 wt.-% $B_4C$
0.5-1.5 wt.-% $Y_2O_3$
0.1-1.0 wt.-% $Fe_2O_3$
and the remainder $Al_2O_3$ and unavoidable impurities.

The proportion of $Al_2O_3$ can be from 40.0 wt.-% to 70.0 wt.-%. The proportion of $Al_2O_3$ can be as much as 78.4 wt.-%.
and b) second layer, containing:
10.0-30.0 wt.-% Si
40.0-70.0 wt.-% $Al_2O_3$
10.0-30.0 wt.-% $Al(OH)_3$
1.0-3.0 wt.-% $B_4C$
2.0-4.0 wt.-% $Y_2O_3$
and the remainder $Al_2O_3$ and unavoidable impurities.

The proportion of $Al_2O_3$ can preferably be from 40.0 wt.-% to 70.0 wt.-%. The proportion of $Al_2O_3$ can be as much as 77.0 wt.-%.

The first layer (a) is, according to the invention, a base layer. The second layer (b) is, according to the invention, a cover layer.

A preferred embodiment of the invention is a roller wherein the coating has at least one layer containing:
a) first layer, containing:
15.0-25.0 wt.-% Si
15.0-25.0 wt.-% $Al(OH)_3$
1.5-2.5 wt.-% $B_4C$
0.8-1.2 wt.-% $Y_2O_3$
0.3-0.7 wt.-% $Fe_2O_3$
and the remainder $Al_2O_3$ and unavoidable impurities.

The proportion of $Al_2O_3$ can preferably be from 50.0 wt.-% to 60.0 wt.-%. The proportion of $Al_2O_3$ can be as much as 67.4 wt.-%.
and b) second layer, containing:
15.0-25.0 wt.-% Si
15.0-25.0 wt.-% $Al(OH)_3$
1.5-2.5 wt.-% $B_4C$
2.8-3.2 wt.-% $Y_2O_3$
and the remainder $Al_2O_3$ and unavoidable impurities.

The proportion of $Al_2O_3$ can preferably be from 50.0 wt.-% to 60.0 wt.-%. The proportion of $Al_2O_3$ can be as much as 65.7 wt.-%.

With this coating, good results are achieved in the hot forming of AlSi-coated metal parts.

The roller according to the invention includes one layer, the first or the base layer. The base layer is a hard layer compared to the second layer or cover layer. It has proved advantageous for long-term use to apply the softer cover layer. The cover layer is, in fact, worn away by wear; but since the hard base layer is present, the roller can be operated substantially longer than conventional rollers for a roller furnace. Consequently, a roller with two layers according to the invention is very advantageous.

The roller for hot forming of AlSi-coated metal parts preferably contains:
a refractory base body,
a base layer, containing $Al_2O_3$ and $Si_3N_4$ on the outer surface of the refractory base body, for example, 67 wt.-% $Al_2O_3$ and 31 wt.-% $Si_3N_4$. The remainder constitutes sintering aids approx. 0.5 wt.-% $Fe_2O_3$ and approx. 1 wt.-% $Y_2O_3$.
a cover layer, containing, in the fired state, $Si_3N_4$ or silicon oxynitride or silicon-M-oxynitride, wherein M is at least one of the elements Al, Ca, Mg, Y, on the top of the base layer, wherein the proportion of free $SiO_2$ in the layer surface <5 wt.-%, preferably <1 wt.-% of the surface layer.

The refractory base body is preferably produced based on a refractory material, such as mullite, $Al_2O_3$, $SiO_2$, and/or SiC. According to the invention, in the case of porous materials, the pores are sealed by a protective layer primer, in order to prevent oxidation and metal infiltration.

The base layer is based on an $Al_2O_3/Si_3N_4$ brine with an average d50 200 nm particle size. The $Al_2O_3$ content is preferably 50 wt.-% to 80 wt.-%. The $Si_3N_4$ content is [sic] preferably between 20 wt.-% and 50 wt.-% and is preferably approx. 31 wt.-%. The base layer is fired at a temperature of approx. 1470° C. in an $N_2$ atmosphere. The base layer and the cover layer can even be fired together.

The cover layer can contain $Si_3N_4$, silicon oxynitride, SiAlON, or mixtures thereof. The particle size is from 0.1 μm to 150 μm. The $Si_3N_4$ is preferably 20 wt.-% to 70 wt.-%. The aluminum content is preferably 20 wt.-% to 70 wt.-%. The $B_4C$ content is preferably 1 wt.-% to 10 wt.-%.

The roller for a roller furnace can have different forms. Common are smooth rollers and rollers with ribs, as are described in EP 0750169 A1 for the firing of ceramic tiles. Rollers with ribs enable cooling air to circulate on the tile bottom in order to reduce thermal stresses in the sintered product. Rollers with ribs are, consequently, used in roller furnaces with shock cooling in order to avoid cooling cracks in the sintered product.

A preferred embodiment of the invention is a roller wherein the base layer has a thickness of 0.2 mm to 1.0 mm. Good results in the processing of AlSi-coated metal parts are achieved with these thicknesses.

A preferred embodiment of the invention is a roller wherein the cover layer has a thickness of 0.1 mm to 0.5 mm. Good results in the processing of AlSi-coated metal parts are achieved with these thicknesses.

A preferred embodiment of the invention is a roller wherein the roller has a diameter of 60 mm to 80 mm. Good results in the processing of AlSi-coated metal parts are achieved with these diameters.

A preferred embodiment of the invention is a roller wherein the wall of the roller has a thickness of 6 mm to 12 mm. Good results in the processing of AlSi-coated metal parts are achieved with these thicknesses.

A preferred embodiment of the invention is a roller wherein the roller has a length of 2500 mm to 4000 mm. The roller length is very advantageous for the roller furnaces.

A preferred embodiment of the invention is a roller wherein the roller has a taper over a length of 80 mm to 100 mm on both ends.

The principle of low heat transfer by rollers with ribs is also applied for hot forming in roller furnaces. Thus, excessive cooling of metal parts, for example, of metal sheets for metal plates due to the high mass of the rollers should be avoided. Consequently, rollers with ribs are preferably used at the furnace outlet upstream from the transfer station to the industrial robots.

The roller according to the invention preferably comprises a smooth roller or a roller with ribs in order to reduce the contact surfaces between the metal sheet and the ceramic roller. The roller according to the invention comprises a roller with a SiO2-free corrosion protection coating based on silicon nitride.

The ribs of the roller are designed such that they taper, with a radius selected at the tip such that chipping of the brittle ceramic is prevented and scratch marks on the metal plate are avoided.

The base body is produced according to methods known per se such as extrusion or casting of smooth rollers and preferably casting of rollers with ribs.

The roller could, according to the invention, be made of a ceramic material from the group mullite, alumina, or SiC, or mixtures thereof, preferably of SiC materials, such as Si—SiC, or porous SiC materials, such as N—SiC and R—SiC, preferably of silicon nitride, silicon oxynitride, silicon-M-oxynitride, or mixtures thereof.

Since either dense SiC materials, such as Si—SiC, or porous SiC materials, such as N—SiC and R—SiC, can be used, in the case of porous materials a first protective layer a primer is applied according to the invention to seal the pores as protection against oxidation and to prevent metal infiltration.

After the application of the first protective layer, the coating is dried at 110° C. to constant weight and then fired at 1200° C. to 1500° C., preferably at 1350° C. to 1480° C., and a dwell time up to 8 h in a non-oxidizing atmosphere, preferably in an $N_2$ atmosphere.

The SiO-free coating is preferably based on silicon nitride, silicon oxynitride, or silicon-M-oxynitride granules with an average particle size of 0.1 μm to 150 μm. The N content of the layer after firing is 20 wt.-% to 80 wt.-%, preferably 25 wt.-% to 50 wt.-%. After application, the coating is dried at 110° C. to constant weight. Firing of the $Si_3N_4$-coating is done at 1200° C. to 1500° C., preferably at 1350° C. to 1480° C. and a dwell time of up to 8 h in a nonoxidizing atmosphere, preferably in an $N_2$ atmosphere. As a result of this cover layer, the loadbearing surface of the roller according to the invention becomes very smooth. As a result of this non-oxidic loadbearing surface coating, the reaction with nonferrous melts, such as aluminum silicon alloy, in particular of a coating material of coated steel sheets, is avoided.

The layer thickness of the base layer is 0.2 mm to 1.0 mm. The layer thickness of the cover layer is 0.1 mm to 0.5 mm.

In order to increase corrosion resistance and to thermochemically stabilize the nitride coating, it is advantageous for the suspension to include boron material, such as $B_4C$, or/and $Y_2O_3$ powder. The $B_4C$ and/or $Y_2O_3$ content is between 1.5 wt.-% and 5 wt.-% of the layer after firing.

Surprisingly, it has been found that under conditions of use for hot forming, $Si_3N_4$ coatings thus implemented are sufficiently stable against oxidation under the critical condition of an oxidizing atmosphere. The wetting behavior relative to AlSi alloys is not changed by formation of $SiO_2$ even with long-term use.

The object of the present invention is further accomplished by a method for producing a roller for a roller furnace with at least one layer, wherein
a) a roller is coated with a first aqueous suspension for the base layer,
b) the coated roller is dried at 90° C. to 120° C. for 0.5 to 2 hours, and
c) the dried roller is sintered at 1400° C. to 1500° C. for 6 to 8 hours in an $N_2$ atmosphere.

The object of the present invention is further accomplished by a method for producing a roller for a roller furnace with at least one layer, wherein
a) a roller is coated with a first aqueous suspension,
b) the coated roller is dried at 90° C. to 120° C. for 0.5 to 2 hours,
c) the dried roller is coated with a second aqueous suspension,
d) the coated roller is dried at 90° C. to 120° C. for 0.5 to 2 hours, and
e) the dried roller is sintered at 1400° C. to 1500° C. for 6 to 8 hours in an $N_2$ atmosphere.

A preferred embodiment of the invention is a method for producing a roller for a roller furnace with at least one layer, wherein the roller is first sintered in an $N_2$ atmosphere, then is coated, and the coated roller is sintered again, or the roller is coated unsintered as a green body and the roller with one or a plurality of layers is sintered.

The layers are obtained according to methods known per se for coating furnace furniture, for example, by spraying or dip-coating with an aqueous slurry or suspension.

After application of the base layer, drying is preferably done at approx. 110° C. to a constant weight.

After application of the cover layer on the base layer, the roller is preferably dried to a constant weight at approx. 110° C. An additional firing is carried out preferably in an $N_2$ atmosphere with a dwell time of up to 8 hours at approx. 1470° C.

According to the invention, both layers can also be fired together at a temperature of approx. 1470° C.

The roller can be produced from all conventional and known ceramic materials. Preferably used as roller material are nitride-bonded SiC, silicon-infiltrated SiC, and recrystallized SiC, mullite, or mixtures thereof.

The object of the present invention is accomplished by the use of a roller for a roller furnace having a coating on the surface for hot forming metal parts, in particular AlSi coated metal sheets.

The present invention is explained in detail with reference to examples and a drawing.

Four examples according to the invention and two comparative examples were carried out.

Used as roller material was nitride-bonded SiC, silicon-infiltrated SiC, and recrystallized SiC, mullite, or mixtures thereof. The coating was applied on a roller with a diameter of 40 mm and a length of 300 mm for the assessment of the adhesion of the coating on a curved surface; and for corrosion testing, on sheets measuring 100 mm×100 mm×8 mm.

For the corrosion test, the rollers and plates were loaded with AlSi-coated metal sheets as well as cubes of compacted AlSi. The test was performed at 900° C. in an oxidizing atmosphere for 96 h in an electrically heated laboratory furnace.

The invention is explained in detail in the following with reference to examples and comparative examples as well as to a drawing. The invention is in no way restricted thereby.

EXAMPLE 1

Base body coated only with a base layer
NSiC base body N-Durance® was coated with an aqueous suspension of AnnaPlast 171-5 (Table 4)
then dried at 110° C. for 1 hour and then sintered at 1470° C. for 7 hours in an $N_2$ atmosphere. More detailed data are found in Table 1.

EXAMPLE 2

Base body coated with a base layer and a cover layer

NSiC base body N-Durance® was coated with an aqueous suspension of AnnaPlast 171-5 (Table 4),
then dried at 110° C. for 1 hour,
then coated with an aqueous suspension of AnnaPlast 171-3 (Table 4), and
then dried at 110° C. for 1 hour, and
then sintered at 1470° C. for 7 hours in an $N_2$ atmosphere. More detailed data are found in Table 1.

TABLE 1

Example 1 and Example 2

| Invention | | Example 1 | Example 2 |
|---|---|---|---|
| Components | Base body | Fired, containing: | Fired, containing: |
| | Base body contains: | N-Durance ® | N-Durance ® |
| | | Single coated | Double coated |
| | Layer 1 contains: | cf. Apl 171-5 | Apl 171-5 |
| | Layer 2 contains: | No 2nd layer | Apl 171-3 |
| | Firing | 1470° C. - $N_2$ atmosphere | 1470° C. - $N_2$ atmosphere |
| Field test with rollers | Temperaturee | 900° C. | 900° C. |
| | Time | <4000 h | <4000 h |
| | Result | no infiltration or reaction with the roller structure, slight, uniform, readily removable caking | no infiltration or reaction with the roller structure, very slight, uniform, readily removable caking |
| Corrosion test | Temperature | 900° C. | 900° C. |
| | Time | 90 h | 90 h |
| | Result | no infiltration no caking | no infiltration no caking |

EXAMPLE 3

Green base body coated with a base layer, wherein the layer was free of silicon oxide.

NSiC base body N-Durance® was coated with an aqueous suspension of AnnaPlast 171-5 (Table 4)
then dried at 110° C. for 1 hour and
then sintered at 1470° C. for 7 hours in an $N_2$ atmosphere. More detailed data are found in Table 2.

EXAMPLE 4

Green base body coated with a base layer and a cover layer, wherein both layers were free of silicon oxide.

NSiC base body N-Durance® was coated with an aqueous suspension of (AnnaPlast 171-5 (Table 4),
then dried at 110° C. for 1 hour,
then coated with an aqueous suspension of AnnaPlast 171-3 (Table 4), and
then dried at 110° C. for 1 hour, and
then sintered at 1470° C. for 7 hours in an $N_2$ atmosphere. More detailed data are found in Table 2.

TABLE 2

Example 3 and Example 4

| Invention | | Example 3 | Example 4 |
|---|---|---|---|
| Components | Base body | Unfired, containing: | Unfired, containing: |
| | Base body contains: | N-Durance ® | N-Durance ® |
| | | Single coated | Double coated |
| | Layer 1 contains: | Apl 171-5 | Apl 171-5 |
| | Layer 2 contains: | No 2nd layer | Apl 171-3 |
| | Firing | 1470° C. - $N_2$ atmosphere | 1470° C. - $N_2$ atmosphere |
| Field test with rollers | Temperature | 900° C. | 900° C. |
| | Time | <4000 h | <4000 h |
| | Result | no infiltration or reaction with the roller structure slight, uniform, readily removable caking | no infiltration or reaction with the roller structure very slight, uniform, readily removable caking |
| Corrosion test | Temperature | 900° C. | 900° C. |
| | Time | 90 h | 90 h |
| | Result | no infiltration no caking | no infiltration no caking |

COMPARATIVE EXAMPLES 1 AND 2 (PRIOR ART)

For this, two base bodies NSiC base bodies N-Durance® were single coated with a coating containing $Al_2O_3$ and $SiO_2$,
then dried at 110° C. for 1 hour, and
then sintered at 1250° C. for 7 hours in an $O_2$ atmosphere. More detailed data are found in Table 3.

TABLE 3

Comparative Example 1 and Comparative Example 2

| Prior Art | | Comparative Example 1 | Comparative Example 2 |
|---|---|---|---|
| Components | Base body | Fired, containing: | Fired, containing: |
| | Base body contains: | Mullite rollers mullite, corundum | N-Durance ® |
| | | Single coated | Single coated |
| | Layer 1 contains: | From the group $Al_2O_3/SiO_2$ | From the group $Al_2O_3/SiO_2$ |
| | Layer 2 contains: | No 2nd layer | No 2nd layer |
| | Firing | <1250° C. - $O_2$ atmosphere | <1250° C. - $O_2$ atmosphere |
| Field test with rollers | Temperature | 900° C. | 900° C. |
| | Time | <4000 h | <4000 h |
| | Result | Firm, nonuniform adhesion of AlSi on the roller surface, AlSi diffuses into the "porous" roller structure, chemical reactions result in roller breakage. | Removal of the coating material, adhesion of AlSi, Firm, nonuniform adhesion of AlSi on the roller surface. |
| Corrosion test | Temperature | 900° C. | 900° C. |
| | Time | 90 h | 90 h |
| | Result | Infiltration Caking | Infiltration Caking |

As seen in Tables 1 to 3, rollers according to the invention have greater durability than already known rollers. Known rollers from the Comparative Examples have the disadvantages of these rollers, namely infiltration and caking, which results in removal of the coating material and also in roller breakage. The result was unexpected and surprising.

The following Table 4 presents the ingredients of the aqueous suspensions for producing the layers.

TABLE 4

| Layer 1 Apl 171-5 Base Layer | | Layer 2 Apl 171-3 Cover Layer | |
|---|---|---|---|
| % | | % | |
| 19.704 | Si | 19.417 | Si |
| 19.704 | Al(OH)$_3$ | 19.417 | Al(OH)$_3$ |
| 57.143 | Al$_2$O$_3$ | 56.311 | Al$_2$O$_3$ |
| 1.970 | B$_4$C | 1.942 | B$_4$C |
| 0.494 | Fe$_2$O$_3$ | 0.000 | Fe$_2$O$_3$ |
| 0.985 | Y$_2$O$_3$ | 2.913 | Y$_2$O$_3$ |
| 100.000 | Total | 100.000 | Total |

The drawing comprises FIG. 1.

FIG. 1 depicts the side view of a roller for a roller furnace having a coating on the surface. The coated roller 1 comprises a base body 2 and a coating on the outer surface of the base body of the roller 1. The roller 1 is a hollow roller with a cavity 3. The roller 1 has a taper 4 on both ends for attaching the drive sleeve. The roller 1 includes as material N-Durance®. The roller 1 has, by way of example, a diameter of 60 mm and a length of 3070 mm. On both ends, the roller 1 is tapered over a length of 80 mm to a diameter of 59 mm. The roller includes, according to the invention, a coating with at least one or at least two layers on the outer surface.

LIST OF REFERENCE CHARACTERS 1 roller
2 roller base body
3 cavity of the roller
4 taper at the ends of the roller

The invention claimed is:

1. A roller for a roller furnace with a roller base body and a coating on the surface, wherein the coating has at least one layer, containing:
   10.0-30.0 wt.-% Si
   10.0-30.0 wt.-% Al(OH)$_3$
   1.0-3.0 wt.-% B$_4$C
   0.5-1.5 wt.-% Y$_2$O$_3$
   0.1-1.0 wt.-% Fe$_2$O$_3$
   and the remainder Al$_2$O$_3$.

2. The roller for a roller furnace according to claim 1, wherein the coating has at least one layer, containing:
   15.0-25.0 wt.-% Si
   15.0-25.0 wt.-% Al(OH)$_3$
   1.5-2.5 wt.-% B$_4$C
   0.8-1.2 wt.-% Y$_2$O$_3$
   0.3-0.7 wt.-% Fe$_2$O$_3$
   and the remainder Al$_2$O$_3$.

3. The roller for a roller furnace according to claim 1, wherein the roller has a diameter of 60 mm to 80 mm.

4. The roller for a roller furnace according to claim 1, wherein the wall of the roller has a thickness of 6 mm to 12 mm.

5. The roller for a roller furnace according to claim 1, wherein the roller has a length of 2500 mm to 4000 mm.

6. The roller for a roller furnace according to claim 1, wherein the roller has a taper on both ends over a length of 80 mm to 100 mm.

7. The roller for a roller furnace according to claim 1, wherein the coating has at least,
   a) a first layer, containing:
   10.0-30.0 wt.-% Si
   10.0-30.0 wt.-% Al(OH)$_3$
   1.0-3.0 wt.-% B$_4$C
   0.5-1.5 wt.-% Y$_2$O$_3$
   0.1-1.0 wt.-% Fe$_2$O$_3$
   and the remainder Al$_2$O$_3$
   and
   b) a second layer, containing:
   10.0-30.0 wt.-% Si
   10.0-30.0 wt.-% Al(OH)$_3$
   1.0-3.0 wt.-% B$_4$C
   2.0-4.0 wt.-% Y$_2$O$_3$
   and the remainder Al$_2$O$_3$.

8. The roller for a roller furnace according to claim 7, wherein,
   a) the first layer, contains:
   15.0-25.0 wt.-% Si
   15.0-25.0 wt.-% Al(OH)$_3$
   1.5-2.5 wt.-% B$_4$C
   0.8-1.2 wt.-% Y$_2$O$_3$
   0.3-0.7 wt.-% Fe$_2$O$_3$
   and the remainder Al$_2$O$_3$
   and
   b) the second layer, contains:
   15.0-25.0 wt.-% Si
   15.0-25.0 wt.-% Al(OH)3
   1.5-2.5 wt.-% B$_4$C
   2.8-3.2 wt.-% Y$_2$O$_3$
   and the remainder Al$_2$O$_3$.

9. The roller for a roller furnace according to claim 7, wherein the proportion of Al$_2$O$_3$ in the first layer is 40.0-70.0 wt.-%, and the proportion of Al$_2$O$_3$ in the second layer is 40.0-70.0 wt.-%.

10. The roller for a roller furnace according to claim 9, wherein the proportion of Al$_2$O$_3$ in the first layer is 50.0-60.0 wt.-% and the proportion of Al$_2$O$_3$ in the second layer is 50.0-60.0 wt.-%.

11. The roller for a roller furnace according to claim 7, wherein the first layer has a thickness of 0.2 mm to 1.0 mm.

12. The roller for a roller furnace according to claim 7, wherein the second layer has a thickness of 0.1 mm to 0.5 mm.

13. A method for producing a roller for a roller furnace with at least one layer according to claim 1, comprising:
   a) coating a roller with a first aqueous suspension,
   b) drying the coated roller at 90° C. to 120° C. for 0.5 to 2 hours,
   and
   c) sintering the dried roller at 1400° C. to 1500° C. for 6 to 8 hours in an N$_2$ atmosphere.

14. The method for producing a roller for a roller furnace according to claim 13, wherein the roller sintered in an N$_2$ atmosphere is coated and the coated roller is sintered, or the roller is coated and the coated roller is sintered.

15. A method for producing a roller for a roller furnace with at least one layer according to claim 1, comprising:
   a) coating a roller with a first aqueous suspension,
   b) drying the coated roller at 90° C. to 120° C. for 0.5 to 2 hours,
   c) coating the dried roller with a second aqueous suspension,
   d) drying the coated roller at 90° C. to 120° C. for 0.5 to 2 hours, and e) sintering the dried roller at 1400° C. to 1500° C. for 6 to 8 hours in an N$_2$ atmosphere.

16. A method comprising hot forming metal parts with a roller for a roller furnace according to claim 1.

17. The method according to claim 16, wherein the hot forming metal parts are AlSi coated metal sheets.

* * * * *